United States Patent [19]

Denny et al.

[11] 4,029,603

[45] June 14, 1977

[54] CATALYTIC COATING COMPOSITION AND A METHOD FOR MAKING A COATED SURFACE FOR AN OVEN

[75] Inventors: Patrick John Denny, Norton; Robert Robertson, Warrington, both of England

[73] Assignees: Imperial Chemical Industries Limited; T. I. Domestic Appliances Limited, both of London, England

[22] Filed: Jan. 30, 1976

[21] Appl. No.: 653,709

Related U.S. Application Data

[63] Continuation of Ser. No. 450,217, March 11, 1974, abandoned.

[30] Foreign Application Priority Data

Mar. 26, 1973 United Kingdom ............ 14342/73

[52] U.S. Cl. .............................. 252/471; 252/472; 252/475; 252/476; 252/477 R; 126/19 R; 427/330

[51] Int. Cl.² .................... B01J 23/18; B01J 23/34; B01J 23/72; B01J 23/84

[58] Field of Search .......... 252/471, 472, 475, 476, 252/477 R; 106/48; 126/19 R; 427/330

[56] References Cited

UNITED STATES PATENTS

| 2,981,634 | 4/1961 | Davis et al. ..................... 427/330 |
| 3,580,733 | 5/1971 | Ott ................................. 126/19 R |
| 3,627,560 | 12/1971 | Morgan .......................... 126/19 R |
| 3,668,152 | 6/1972 | Lee ................................ 252/477 R |

*Primary Examiner*—W. J. Shine
*Attorney, Agent, or Firm*—Cushman, Darby & Cushman

[57] ABSTRACT

A coating composition suitable for application to the internal surfaces of ovens to render these self cleaning comprising a milled self-matting devitrifying enamel frit and antimony trioxide or a precursor thereof, preferably together with an oxidation catalyst comprising an oxide of copper, manganese or cobalt. The coating adheres directly to metal surfaces and avoids the necessity for first applying a ground coat.

12 Claims, No Drawings

CATALYTIC COATING COMPOSITION AND A METHOD FOR MAKING A COATED SURFACE FOR AN OVEN

This is a continuation of application Ser. No. 450,217 filed Mar. 11, 1974, now abandoned.

This invention relates to a catalytic coating composition containing a catalyst for the oxidation of fat and suitable for surfaces liable to be fouled by fat oxidation products, such as the walls of cooking ovens.

The production of catalytic coating compositions for application to the internal surfaces of ovens to render these self-cleaning has been the subject of research for many years. Such coating compositions comprise a binding material, usually an enamel, and an oxidation catalyst and when they are applied directly to metal surfaces careful control of the conditions of application is necessary if satisfactory adhesion to the metal surfaces is to be achieved. Therefore the coatings are usually applied to metal surfaces over a ground coat which gives good adhesion to the metal, i.e. as part of a two-coat system, although a one-coat system would be advantageous.

According to the present invention we provide a coating composition suitable for application to the internal surfaces of ovens which comprises a milled self-matting devitrifying enamel frit and antimony trioxide or a precursor thereof which decomposes to produce antimony trioxide on heating.

Further according to the invention we provide a method of making a coated surface for an oven which comprises forming an aqueous slip containing a self-matting devitrifying enamel frit and antimony trioxide or a precursor thereof, which decomposes to antimony trioxide on heating, with water containing less than 0.08% by weight of chloride ions, applying the slip to a metal surface and sintering to cause the coating to adhere to the metal surface.

Further according to the invention we provide an internal wall for an oven having a coating comprising a self-matting devitrifying enamel frit and antimony trioxide.

The antimony trioxide is present as an adhesion promoting compound and is believed to form a low-melting point phase with a oxide layer on a metal surface when the coating composition which has been applied to the surface is sintered. Suitable precursors include ammonium antimonate, ammonium antimonite and antimony tartarate.

Preferably the enamel frit contains an oxide of at least one of the metals magnesium, calcium, strontium, barium or zinc, preferably in an amount up to 10% by weight of the frit. Especially suitable frits are those described in U.S. Pat. No. 3,939,295 (corresponding to French Pat. No. 71171217), for example a frit having the weight percentage composition:

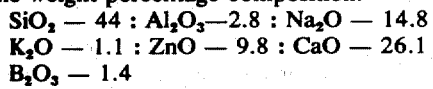

$SiO_2$ — 44 : $Al_2O_3$—2.8 : $Na_2O$ — 14.8
$K_2O$ — 1.1 : ZnO — 9.8 : CaO — 26.1
$B_2O_3$ — 1.4

Other suitable frit compositions are based on $Li_2O$-$(Al_2O_3)SiO_2$ and glasses with heavy additions of transition metals such as $MnO_2$, $Fe_3O_4$, CoO, CuO etc.

Preferably the coating compositions are catalytic coatings containing oxidation catalysts. Suitable catalysts include those described in U.K. Pat. No. 1,300,217 and U.S. Pat. No. 3,988,514 (Corresponding to French Pat. No. 7140671). Such catalysts comprise transition metals or their compounds, preferably oxides or compounds such as carbonates, basic nitrates or basic carbonates which decompose to oxides during firing of the coating, in finely divided form. Suitable metals are copper, vanadium, bismuth, molybdenum, manganese, iron, nickel, platinum-group metals, tin, niobium, chromium, tungsten, rhenium, cobalt or cerium or mixtures or compounds of two or more of these. Especially active coatings are obtained if the catalyst contains an oxide of copper, manganese or cobalt, particularly when copper or maganese is present together with at least one other oxide of a metal, e.g. cobalt, in the above list. Preferably the catalyst is present in the form of "hard" particles prepared as described in U.S. Pat. No. 3,988,514 hard meaning hard enough to withstand without break-down the processes involved in applying the coating composition to a metal surface. These hard particles are preferably prepared by compressing a catalytic composition into large particles which are cylindrical pellets or compacts made by roll compaction having a crushing strength (as hereinafter defined) of at least 1500 p.s.i.g., milling the pellets and selecting a fraction having an average size greater than 2 microns. The crushing strength is the force which when applied to unit area of the ends of a cylindrical pellet before crushing will just break the pellet. Alternatively the hard particles may be made by spray drying.

The slip formed in the method of the invention preferably contains the milled enamel frit in proportions between 50 and 90% by weight of the slip. When the coating contains a catalyst, this is preferably present in an amount up to 50% by weight of the frit. Antimony trioxide or a precursor thereof can be added to the slip in finely divided form but is preferably incorporated as a mill additive during grinding of the frit. Preferably antimony trioxide or a precursor thereof is present in the frit in an amount up to 15% by weight of the frit, particularly 0.15 to 4% by weight. Preferably antimony trioxide or a precursor thereof is added directly to the slip or to the frit during grinding thereof. It may however be incorporated in the catalyst by milling together with the catalyst before inclusion in the slip. The water used in forming the slip is preferably demineralised water although water from the normal supply may be used if it has a chloride ion content below 0.08% by weight. Preferably the chloride content of the water in the slip is below 0.03% by weight.

If desired the coating composition may be prepared as a dry-mix, the dry milled fruit being mixed with antimony trioxide or a precursor thereof and additives such as clay and then with catalyst. Water is later added to the total mixture.

Preferably the metal surface to which the coating composition is applied is a steel surface which has been previously subjected to a treatment comprising the steps of degreasing, metal etching with acid, nickel deposition and neutralization, a particularly suitable treatment comprises the following steps [It should be noted however that the degree of adhesion of the coatings formed is not very sensitive to certain stages in the metal preparation and the degree of metal etch and amount of nickel coating may be allowed to vary widely]:

1. Degreasing using, e.g. trichloroethylene vapour.
2. Initial derusting using, e.g. 3–4% sulphuric acid solution at 60° C.
3. Rinsing with water.

4. Alkaline degreasing using, e.g. a proprietary alkali cleaner such as "Orthosil" at a concentration of 45 g/l at 90° to 100° C.
5. Further rinsing first at e.g. 35° C then at a lower temperature.
6. Pickling and metal etching using, e.g. 7 to 8% sulphuric acid solution for 7 minutes at 65° to 70° C.
7. Further rinsing with cold water.
8. Nickel deposition using, e.g. an 11 g/l $NiSO_4$ solution at 70° to 75° C and pH 3.5 to 4. A suitable nickel pickup is 70 to 90 mgs/sq. ft (preferably 80 mgs).
9. Further rinsing with cold water.
10. Neutralization using, e.g. dilute (about one-eighth to one-fourth percent) mixed solution of sodium carbonate and borax at a temperature of about 90° C.
11. Rapid drying.

In the preferred mode of operating the method of the invention catalyst particles are mixed with an initial slip comprising the milled enamel frit and antimony trioxide particles and additives, such as clay and electrolytes, which are usually added in enamelling to adjust rheological properties. Sufficient demineralised or chloride-free water is added to form a fluid slurry. When this slurry is allowed to age by standing for 24 hrs or more the adhesion of the coating produced is improved. The resulting slip is applied to a metal surface by flow-coating, spraying or dipping so as to give a final thickness, after firing, of preferably 0.012 to 0.035 cms. The coating is then dried before being sintered by heating to a temperature preferably in the range 700° to 850° C for a period preferably within the range 2 to 5 minutes. Preferred coatings have porosities within the range 20 to 50%, as determined by water-uptake and a hardness sufficiently large to permit use in domestic ovens, i.e. within the range 2.5 to 5 Moh's scale.

The coating compositions of the invention give good adhesion when applied directly to metal surfaces thus enabling catalytic coatings to be applied to oven surfaces by a one-coat system.

The invention is illustrated by the following Examples:

EXAMPLE 1

Preparation of coating

A mixed Cu/Co/Mn oxide composition in which the atomic ratio of the metals of the component oxides was 20:20:60 respectively was produced by co-precipitation from the mixed metal nitrate solutions with sodium carbonate solution followed by thorough washing and calcination at 400° C for 1 hr. The resulting oxide mixture which contained some residual carbonate was pelleted in a die to cylindrical pellets 3.6 mm high by 5.4 mm diameter having a mercury penetration density of 2.6 g/cc and a porosity of about 50%. The pellets were milled to pass a 100 mesh sieve but to be held to the extent of 25% by a 200 mesh sieve (i.e. size range up to 152 microns) and mean diameter 20 to 40 microns as determined by an X-ray sedimentation method. Then 33 gms of this powder was mixed with 156 gms of a slip containing 100 gms of frit and 0.75 g of antimony trioxide. The frit had been ground such that 94% of it passed a 200 mesh sieve, i.e. particle size mainly under 76 microns. The slip contained such additives, e.g. clay (5%) and electrolytes, as are usual in enamelling. After adjustment of fluidity by adding demineralised water (all water contained in the slip contained less than 0.03% by weight chloride ions) this slip was dip-coated onto a 7.5 × 7.5 cm square sheet of enamelling iron, which had been subjected to the preparation hereinbefore described, so as to give a final thickness, after firing, of 0.02 cms and a wet dip weight of 100 gms/sq. ft. The coating was allowed to dry and was sintered by heating at 780° C for 3.5 mins. The porosity of the coating, as determined by water-uptake, was 33% and the hardness 2.5 to 3 on Moh's scale.

The enamel frit used was supplied by Radiation Enamels Ltd. and was of the type described in U.S. Pat. No. 3,939,295. The weight percentage composition was as follows:

$SiO_2$ — 44% : $Al_2O_3$ — 7.8% : $Na_2O$ — 14.8%
$K_2O$ — 1.1% : $ZnO$ — 4.9% : $CaO$ — 26.0%
$B_2O_3$ — 1.4%

Test of catalytic activity

A coated sheet was tested by weighing, applying 11 successive drops of molten lard (approx. 14.5 mg each) and then heating to 275° C in air for 3 hrs., after each addition of lard, whereafter the sheet was weighed again. Table 1 shows the number of drips applied, the weight of applied fat and of residue and the percentage of the applied fat which remained as residue.

Table 1

| Drop Number | Residue g × $10^4$ |
|---|---|
| 1 | 14 |
| 2 | 26 |
| 3 | 34 |
| 4 | 42 |
| 5 | 44 |
| 6 | 46 |
| 7 | 48 |
| 8 | 54 |
| 9 | 56 |
| 10 | 58 |
| 11 | 58 |
| % residue after drop 11 | 3.8 |

The results show that the coating effectively causes removal of the fat first applied and permits only a small residue to accumulate.

Test of adhesion

A number of coated plates were subjected to the following test:

A weight of 500 gms was dropped down a tubular guide from a height of 70 cms onto a ball-bearing of diameter 2.54 cms which rested on the upper surface of the sample under test. The ball thus strikes the surface with considerable force causing a circular depression on the plate. The plate was removed and examined visually. With very good adhesion on normal glossy enamels, no enamel is removed by the deformation, whereas with poor adhesion enamel shales off to leave a bare metal surface. The extent to which the coating shaled off was estimated visually in each case. Although the coatings are brittle and are damaged by the impacts, a layer of coating remains adhering to the metal if the adhesion is good and the coating breaks within itself rather than separating at the metal/coating interface.

A similar test is recommended by the Institute of Vitreous Enamellers and is widely used in the enamelling industry. It measures impact resistance rather than true adhesion. Its major advantage is that it is far more convenient and rapid than more sophisticated tests and probably gives a better measure of the damage likely to occur in practice.

The results are given in Table 2 and show that good adhesion to metal is obtained using the coating compositions of the invention. The degree of adhesion after testing was estimated visually and graded, excellent, very good, good, fair and poor.

| Components in coating composition | Estimated degree of adhesion | Porosity |
|---|---|---|
| Self-matting frit + catalyst + Sb₂O₃ | excellent | 33% |
| Self-matting frit + Sb₂O₃ — no catalyst | fair | ca. 15% |
| Self-matting frit + catalyst — no Sb₂O₃ | fair | 33% |
| Non-self-matting frit + catalyst + Sb₂O₃* | poor | <1% |
| Self matting frit alone | poor | 15% |

*The frit used was a conventional ground coat type.

EXAMPLE 2

Example 1 was repeated using a catalyst comprising mixed copper, cobalt and manganese carbonates, the atomic ratio of the metals of the component carbonates being 20:20:60 respectively. The catalyst was produced as described in Example 1 except that the calcination step was omitted. 40 gms of catalyst in 15 gms of water was mixed with a slip comprising 100 gms frit, 5 gms clay, 0.5 gms bentonite, 0.75 gms antimony trioxide and 50 gms water. The coating obtained was tested as described in Example 1, the results being as follows:
Porosity 33%
Hardness: 3 on Moh's scale
Catalytic activity-residue of applied fat after 11 drops : 3.5%
Adhesion : excellent

EXAMPLE 3

Example 1 was repeated using catalyst particles prepared by spray drying in the following manner using a 'Nitro' spray drier:
A suitable binder, such as 1.5% "Mowiol" N 30-88 (a mixture of Polyvinyl acetate and polyvinyl alcohol) supplied by Hoechst, was used. The disc speed was 18,000 rpm and a chamber diameter of 2.2 m was used. Oxide particles of mean particle size of 75 $\mu$ were produced. The powder had a top bulk density of 0.8 g/ml. The coating obtained was tested as described in Example 1, the results being as follows:
Porosity 30%
Hardness 3.5 on Moh's scale
Catalytic activity — residue of applied fat after 11 drops : 4.5%
Adhesion: very good

EXAMPLE 4

Example 1 was repeated using a slip containing 0.25% antimony trioxide. The slurry produced by mixing the catalyst with the slip was aged for 24 hours before being coated onto a sheet of enamelling iron. The coating obtained was tested as described in Example 1, the results being as follows:
Porosity 33%
Hardness 3 on Moh's scale
Catalytic activity — residue of applied fat after 11 drops : 3.5%
Adhesion : excellent If the slip was not aged before being applied to the metal surface the adhesion was fair to good.

EXAMPLE 5

Example 1 was repeated using the differing frits A, B, C whose compositions are set out below. The results obtained were similar to those of Example 1.

Wt. % composition of frits A, B and C:

| Frit A | $SiO_2$ – 60.0 | $Al_2O_3$ – 21.0 | $MgO$ – 3.0 |
|---|---|---|---|
|  | $CaO$ – 3.0 | $Na_2O$ – 1.0 | $B_2O_3$ – 2.0 |
|  | $Li_2O$ – 10.0 | | |
| Frit B | $SiO_2$ – 37.0 | $B_2O_3$ – 1.2 | $Na_2O$ – 1.4 |
|  | $K_2O$ – 4.5 | $MnO_2$ – 0.9 | $CaO$ – 10.6 |
|  | $Li_2O$ – 0.3 | $TiO_2$ – 15.0 | $Fe_2O_3$ – 18.8 |
|  | $ZrO_2$ – 2.5 | $Al_2O_3$ – 3.1 | $CoO$ – 3.3 |
|  | $CuO$ – 1.4 | | |
| Frit C | $SiO_2$ – 35.2 | $B_2O_3$ – 3.1 | $Na_2O$ – 6.8 |
|  | $K_2O$ – 5.6 | $BaO$ – 1.8 | $MnO_2$ – 25.7 |
|  | $CaO$ – 0.5 | $Li_2O$ – 0.8 | $ZnO$ – 4.2 |
|  | $P_2O_5$ – 0.6 | $TiO_2$ – 8.6 | $Sb_2O_5$ – 7.1 |

We claim:
1. A coating composition suitable for application to the internal surfaces of ovens which comprises a milled self-matting devitrifying enamel frit and an adhesion-promoting compound selected from the group consisting of antimony trioxide and precursors thereof which decompose to produce antimony trioxide on heating and an oxidation catalyst containing an oxide selected from the group consisting of oxides of copper, manganese and cobalt.

2. A coating composition according to claim 1 wherein the frit contains an oxide of a metal selected from the group consisting of magnesium, calcium, strontium, barium and zinc.

3. A coating composition according to claim 1 wherein the adhesion-promoting compound is present in an amount up to 15% by weight of the frit.

4. A coating composition according to claim 3 wherein the adhesion-promoting compound is present in an amount between 0.15 and 4% by weight of the frit.

5. A method for making a coated surface for an oven which comprises forming an aqueous slip consisting essentially of a self-matting devitrifying enamel frit, an adhesion-promoting compound selected from the group consisting of antimony trioxide, and precursors thereof which decompose to produce antimony trioxide on heating selected from ammonium antimonate, ammonium antimonite and antimony tartarate, an oxidation catalyst and water containing less than 0.08% by weight of chloride ions, applying the slip to a metal surface, and sintering to cause the coating to adhere to the metal surface.

6. A method according to claim 5 wherein the slip contains 50 to 90% by weight of the frit.

7. A method according to claim 5 wherein the adhesion-promoting compound is included as a mill additive during grinding of the frit.

8. A method according to claim 5 wherein the chloride content of the water in the slip is less than 0.03% by weight.

9. A method according to claim 5 wherein the metal surface is a steel surface which has been previously subjected to a treatment comprising the steps of degreasing, metal etching with acid, nickel deposition and neutralization.

10. A method according to claim 5 wherein the coating is sintered at a temperature within the range 700° to 850° C.

11. A method according to claim 5 wherein said oxidation catalyst is selected from the group consisting of transition metals or their oxides.

12. An internal wall for an oven having a coating consisting essentially of a self-matting devitrifying enamel frit and antimony trioxide produced according to the method of claim 5.

* * * * *